(12) United States Patent
Yoon

(10) Patent No.: US 11,036,384 B2
(45) Date of Patent: Jun. 15, 2021

(54) PRESSURE-SENSITIVE DEGREE CONTROL METHOD AND SYSTEM FOR TOUCHSCREEN-ENABLED MOBILE TERMINAL

(71) Applicant: Samsung Electronics Co., Ltd., Suwon-si (KR)

(72) Inventor: Tai Ho Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/027,973

(22) Filed: Jul. 5, 2018

(65) Prior Publication Data

US 2018/0314404 A1    Nov. 1, 2018

Related U.S. Application Data

(63) Continuation of application No. 12/880,348, filed on Sep. 13, 2010, now abandoned.

(30) Foreign Application Priority Data

Sep. 14, 2009  (KR) ........................ 10-2009-0086444

(51) Int. Cl.
*G06F 3/0488* (2013.01)
*G06F 3/0485* (2013.01)
(52) U.S. Cl.
CPC .......... *G06F 3/0488* (2013.01); *G06F 3/0485* (2013.01); *G06F 2203/04806* (2013.01)

(58) Field of Classification Search
None
See application file for complete search history.

(56) References Cited

U.S. PATENT DOCUMENTS

| 6,567,102 B2 * | 5/2003 | Kung .................... G06F 3/0481 345/173 |
| 7,382,360 B2 | 6/2008 | Mackey et al. |
| 8,003,875 B2 | 8/2011 | Wang et al. |
| 8,286,102 B1 * | 10/2012 | Wilensky ............ G06F 3/04845 715/782 |
| 2001/0024195 A1 | 9/2001 | Hayakawa |
| 2004/0207605 A1 | 10/2004 | Mackey et al. |
| 2006/0161870 A1 | 7/2006 | Hotelling et al. |
| 2006/0284858 A1 * | 12/2006 | Rekimoto ............... G06F 3/033 345/173 |
| 2007/0024595 A1 * | 2/2007 | Baker .................. G06F 3/03547 345/173 |

(Continued)

FOREIGN PATENT DOCUMENTS

JP    05-346923 A    12/1993
JP    06-202776 A    7/1994

(Continued)

*Primary Examiner* — Stephen T. Reed
(74) *Attorney, Agent, or Firm* — Jefferson IP Law, LLP

(57) ABSTRACT

A pressure-sensitive degree control method and system of a mobile terminal including a touchscreen for controlling interaction degree of the touchscreen based on a pressure level of a touch are provided. The method includes detecting a pressure level of the touch made on the touchscreen, configuring an interaction degree of the user interface to be determined based on the pressure level, and controlling operations of the user interface according to the interaction degree.

19 Claims, 10 Drawing Sheets

(56) References Cited

U.S. PATENT DOCUMENTS

| | | |
|---|---|---|
| 2007/0254722 A1 | 11/2007 | Kim et al. |
| 2008/0024454 A1 | 1/2008 | Everest |
| 2008/0094367 A1* | 4/2008 | Van De Ven ......... G06F 3/0414 345/173 |
| 2008/0204427 A1* | 8/2008 | Heesemans ........... G06F 3/0414 345/174 |
| 2008/0313722 A1 | 12/2008 | Cho et al. |
| 2009/0160793 A1 | 6/2009 | Rekimoto |
| 2010/0005390 A1 | 1/2010 | Bong |
| 2010/0053078 A1 | 3/2010 | Kim et al. |
| 2010/0283740 A1 | 11/2010 | Chao |
| 2011/0043491 A1 | 2/2011 | Oh |

FOREIGN PATENT DOCUMENTS

| | | |
|---|---|---|
| KR | 10-2007-0096243 A | 10/2007 |
| KR | 10-2008-0045143 A | 5/2008 |
| KR | 10-2009-0017188 A | 2/2009 |
| KR | 10-2009-0041612 A | 4/2009 |

* cited by examiner

PRESSURE-SENSITIVE DEGREE CONTROL METHOD AND SYSTEM FOR TOUCHSCREEN-ENABLED MOBILE TERMINAL

PRIORITY

This application is a continuation application of prior application Ser. No. 12/880,348, filed on Sep. 13, 2010, which claimed the benefit under 35 U.S.C. § 119(a) of a Korean patent application filed on Sep. 14, 2009 in the Korean Intellectual Property Office and assigned Serial No. 10-2009-0086444, the entire disclosure of each of which is hereby incorporated by reference.

BACKGROUND OF THE INVENTION

1. Field of the Invention

The present invention relates to a mobile terminal. More particularly, the present invention relates to a pressure-sensitive degree control method and system for a mobile terminal including a touchscreen that controls an interaction degree of the touchscreen based on a pressure level of a touch made thereon.

2. Description of the Related Art

Recently, mobile terminals have been widely used for a variety of functions. The mobile terminals now incorporate various supplementary functions such as an Moving Picture Experts Group Audio Layer 3 (MP3) function for playing audio files in an MP3 file format, a digital camera function for taking and editing pictures, and a game function for playing mobile games. With an increased number of the supplementary functions integrated into a mobile terminal, the display of the mobile terminal has become large in size to support various potential functions. As a result, the mobile terminals have been designed to have a large touchscreen-enabled display that occupies an entire front surface of the mobile terminal.

In a case of the mobile terminal equipped with a touchscreen-enabled display, the touchscreen defines a position with coordinates on X and Y axes and sometimes a Z axis. However, a conventional touchscreen-equipped mobile terminal interprets a gesture made on the touchscreen only with the location information from coordinates on the X and Y axes and not pressure information from the coordinate on the Z axis.

Therefore, a need exists for an apparatus and method for utilizing the coordinate on the Z axis to receive pressure information based on a degree of pressure of a touch made on a touchscreen.

SUMMARY OF THE INVENTION

An aspect of the present invention is to address at least the above-mentioned problems and/or disadvantages and to provide at least the advantages described below. Accordingly, an aspect of the present invention is to provide a pressure-sensitive degree control method and system for a mobile terminal including a touchscreen for adjusting an interaction degree of a user interface according to a pressure level of a touch made on the touchscreen.

In accordance with an aspect of the present invention, a method for providing a user interface of a mobile terminal including a touchscreen is provided. The method includes detecting a pressure level of a touch made on the touchscreen, configuring an interaction degree of the user interface to be determined based on the pressure level, and controlling operations of the user interface according to the interaction degree.

In accordance with another aspect of the present invention, an apparatus for providing a user interface of a mobile terminal is provided. The apparatus includes a touchscreen unit for generating a touch signal in response to a touch, a pressure extractor for extracting information regarding a pressure level of the touch from the touch signal, and a user interface manager for configuring an interaction degree of the user interface to be determined based on the pressure level and for controlling operations of the user interface by adjusting an interaction speed of the user interface according to the touch pressure.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, the term "user interface" refers to a physical and virtual means to accommodate interaction between a user and a specific device. In a case of a mobile terminal, the user interface supports interactions for operation environment settings, an image display, an audio playback, a screen scroll, gaming, a broadcast playback, mobile Internet access, and the like.

In the following description, the term "degree" refers to a level of speed, brightness, volume, and height related to operations of the user interface. For example, the degree of volume denotes a sound level of an audio source, and the degree of speed denotes a speed level of scrolling.

In the following description, the term "pressure-sensitive operation mode" refers to an operation mode in which an interaction degree of the user interface increases/decreases based on pressure level of a touch made on a touchscreen.

Although a mobile terminal represented by a mobile phone is described in an exemplary embodiment of the present invention, the present invention is not limited thereto. However, various electronic devices including a large display such as a Television, a desktop computer, and a laptop computer may be applied. The mobile terminal may be any of a Portable Multimedia Player (PMP), a Personal Digital Assistant (PDA), a Smartphone, a Moving Picture Experts Group Audio Layer 3 (MP3) player, and equivalent information processing and multimedia devices.

Figure 1:
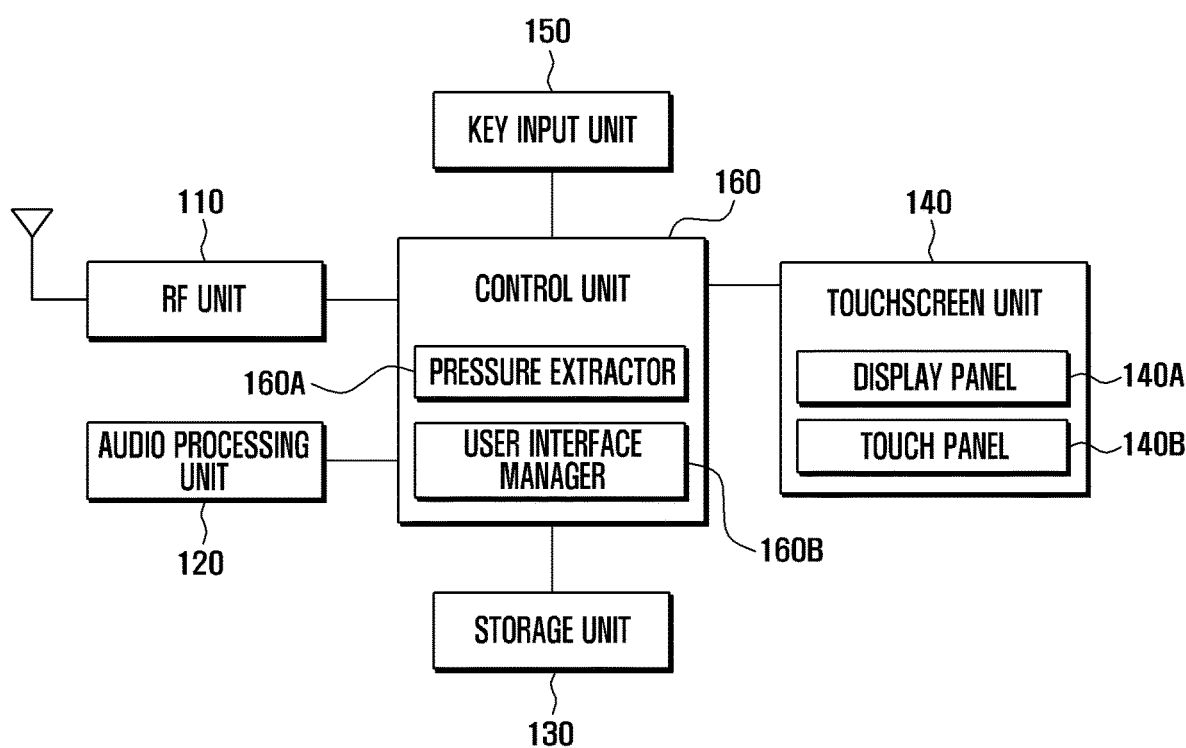
FIG. 1 is a block diagram illustrating a configuration of a mobile terminal according to an exemplary embodiment of the present invention.

FIG. 1 is a block diagram illustrating a configuration of a mobile terminal according to an exemplary embodiment of the present invention.

Referring to FIG. 1, the mobile terminal includes a Radio Frequency (RF) unit 110, an audio processing unit 120, a storage unit 130, a touchscreen unit 140, a key input unit 150, and a control unit 160.

The RF unit 110 processes radio signals carrying communications data. The RF unit 110 may include an RF transmitter for up-converting and amplifying transmission signals and an RF receiver for low-noise-amplifying and down-converting received signals. The RF unit 110 transfers data received on a radio channel to the control unit 160 and transmits the data input from the control unit 160 through the radio channel.

The audio processing unit 120 may include at least one codec, and the at least one codec may include a data codec for processing packet data and voice codec for processing audio signal including voice. The audio processing unit 120 converts digital audio signals to analog audio signals by means of the audio codec to output the audio signals through a Speaker (SPK) and converts analog audio signals input through a microphone to digital audio signals by means of the audio codec.

The storage unit 130 stores application programs and data related to the operations of the mobile terminal and is divided into a program region and a data region. More particularly, in an exemplary implementation, the storage unit 130 stores an application program for configuring a scale of degrees of touch pressure and controlling responsiveness of the user interface depending on the degree of the touch pressure.

The touchscreen unit 140 includes a display panel 140A and a touch panel 140B.

The display panel 140A may be implemented with any of a Liquid Crystal Display (LCD) panel or an Organic Light Emitted Diodes (OLED) panel. The display panel 140A displays information including a menu, a user's input data, function settings, and an operation status in the form of visual images. For example, the display panel 140A displays a booting progress screen, an idle mode screen, a call progressing screen, a settings screen, and application-specific execution screens.

The touch panel 140B detects a touch input made on the touchscreen unit 140. The touch input may be made on the touchscreen unit 140 using a finger or a stylus pen. The touch panel 140B may be implemented with a touch sensor based on a touch sensing technology, such as a capacitive overlay, a resistive overlay, and an infrared beam, and/or a pressure sensor without limitation in the types of sensing technologies.

The touch panel 140B is formed over a top surface of the display panel 140A and also may be formed with an entire surface or a partial surface of one or more sides of the mobile terminal. The touch panel 140B detects a touch and transfers a corresponding touch signal to the control unit 160. In an exemplary implementation, the touch signal includes location information (x, y) and pressure information (z). That is, the control unit 160 acquires the location information and pressure information from the touch signal generated by the touch on the touchscreen unit 140.

The key input unit 150 generates a key signal in response to a key input and transfers the key signal to the control unit 160. The key input unit 150 may be implemented in the form of a keypad including a plurality of numeric keys and navigation keys or a set of function keys on one side of the mobile terminal. In a case when the mobile terminal is implemented with a full touchscreen supporting various user inputs, the key input unit 150 may be integrated into the touchscreen unit 140.

The control unit 160 controls entire operations of the mobile terminal. More particularly, in an exemplary implementation, the control unit 160 includes a pressure extractor 160A and a user interface manager 160B.

If a touch on the touchscreen unit 140 is detected, the pressure extractor 160A receives the touch signal including the location information (x, y) and pressure information (z) from the touchscreen unit 140. The pressure extractor 160A extracts the pressure information from the touch signal and transfers the pressure information to the user interface manager 160B.

The user interface manager 160B controls an interactive speed according to the touch pressure for controlling operations of the user interface. If a touch is detected at a specific position on the touchscreen unit 140, the user interface manager 160B determines whether the touch is maintained over a threshold time duration. The threshold time duration is used to determine whether the touch is a tap touch or a pressure-sensitive touch. The threshold time duration may be set to a default value, e.g., 1 second or 2 seconds. However, the default value setting is not limited thereto and may be set to a variable that changes dynamically according to the touch pattern of the user.

If the touch is maintained over the threshold time duration, the user interface manager 160B configures the user interface to interact based on the degree of the touch pressure. The user interface manager 160B enters a pressure sensitive operation mode in which an interaction degree of the user interface varies according to the touch pressure. For this purpose, the user interface manager 160B uses the pressure information transferred by the pressure extractor 160A to determine the degree of pressure.

In a case when an exemplary phonebook application is running, the user interface manager 160B determines the degree of scroll speed of the phonebook application screen according to the pressure of the touch made on the screen. The user interface manager 160B controls the phonebook application screen to scroll fast or slow as the touch pressure increases or decreases, respectively.

In a case when an exemplary image viewer application is running, the user interface manager 160B determines the degree of the sliding speed of the images according to the pressure of the touch made on the screen. The user interface manager 160B controls the images to slide fast and slow as the touch pressure increases and decreases, respectively.

Although pressure sensitive operations related to the screen scroll and image slide are described in an exemplary embodiment of the present invention, the present invention is not limited thereto. Accordingly, the screen scroll and image slide may be applied to various interactive operations of the user interface. For example, the pressure sensitive degree control may be applied for color brightness and chroma control, motion speed control, sound volume control, and image zoom control.

The pressure sensitive degree control method for a touchscreen-enable mobile terminal is described in more detail below with reference to FIGS. 2 to 8E.

Figure 2:
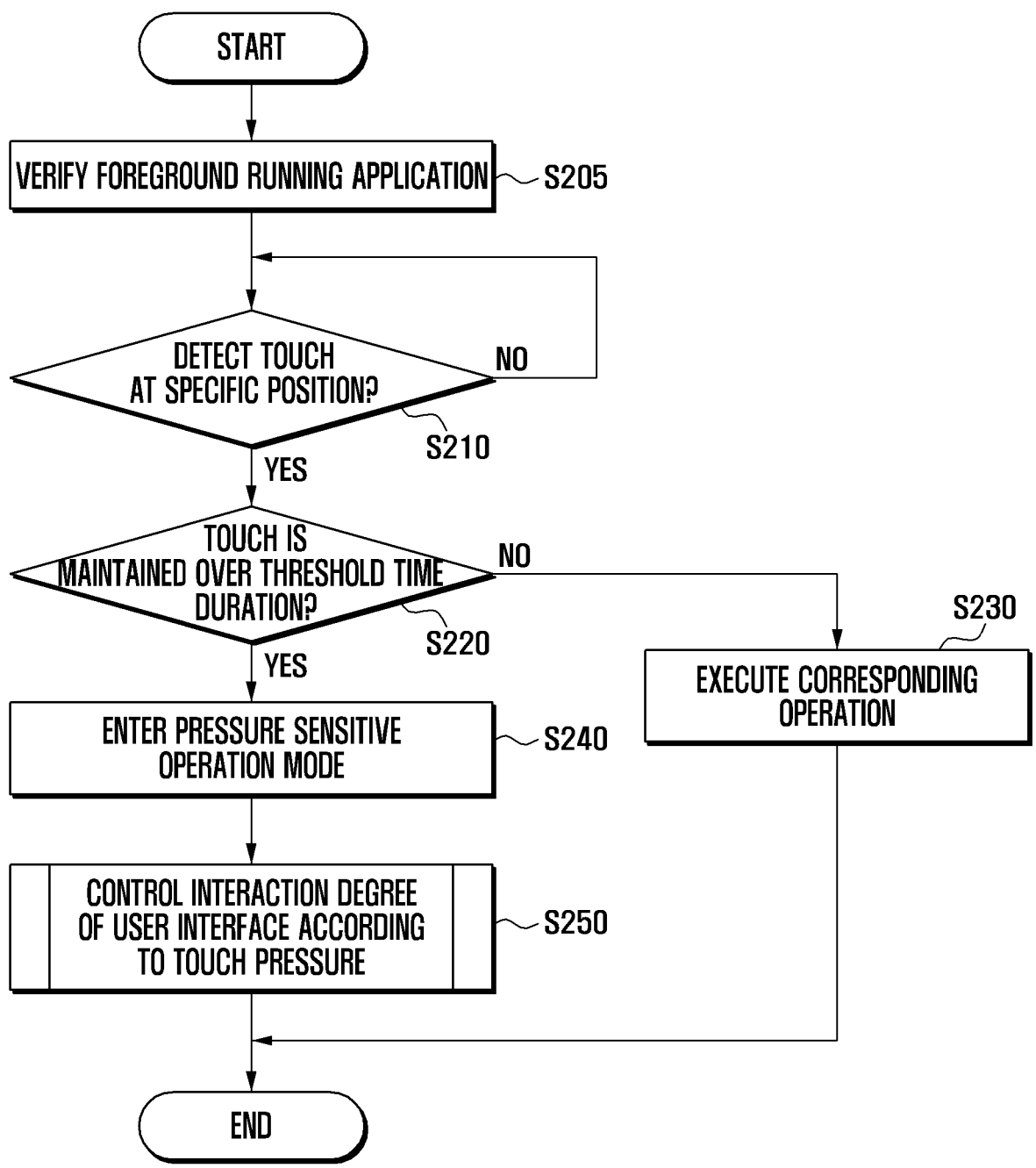
FIG. 2 is a flowchart illustrating a pressure sensitive degree control method for a touchscreen-enabled mobile terminal according to an exemplary embodiment of the present invention.

FIG. 2 is a flowchart illustrating a pressure sensitive degree control method for a touchscreen-enabled mobile terminal according to an exemplary embodiment of the present invention.

The user interface manager 160B first verifies a foreground running application in step S205. The foreground running application may be any application having an application interface with an interactive interface such as a phonebook, an image viewer, a music player, and operation environment settings.

After verifying the foreground running application, the user interface manager 160B monitors a touchscreen to detect a touch made at a specific position in step S210. Here, the specific position may be a soft key formed on the touchscreen for mapping the touch pressure and an interactive function. The specific position may be an area anywhere in a range of the touchscreen which interacts with the pressure of a touch made thereon.

If a touch is detected in step S210, the user interface manager 160B determines whether the touch is maintained over a threshold time duration in step S220. The threshold time duration is used to determine whether the touch is a normal touch event or a pressure-sensitive touch event. If the touch does not remain over the threshold time duration, the user interface manager 160B determines that a normal touch event is input, and thus executes an operation related to the normal touch event in step S230.

If the touch is maintained over the threshold time duration, the user interface manager 160B determines that the pressure sensitive touch event is input, and thus enters a pressure sensitive operation mode in step S240. In the pressure sensitive operation mode, the user interface manager 160B controls an interaction degree of the user interface according to the touch pressure in step S250.

In a case when an exemplary audio player is running, the user interface manager 160B determines a degree of sound volume according to a pressure level of the touch made on the touchscreen. The user interface manager 160B controls such that the sound volume of the audio player increases fast or slow as the touch pressure increases or decreases, respectively.

In a case when an exemplary backlight brightness control function is activated, the user interface manager 160B determines the degree of brightness according to the pressure level of the touch made on the touchscreen. The user interface manager 160B controls such that the brightness of the backlight becomes dark fast or bright slow as the touch pressure increases or decreases, respectively. Although the description has been provided with exemplary cases of the audio player function and the backlight brightness control function, the present invention is not limited thereto. Accordingly, various applications may be applied to determine the pressure sensitive degree according to the pressure level of touch made on the touchscreen.

Figure 3:
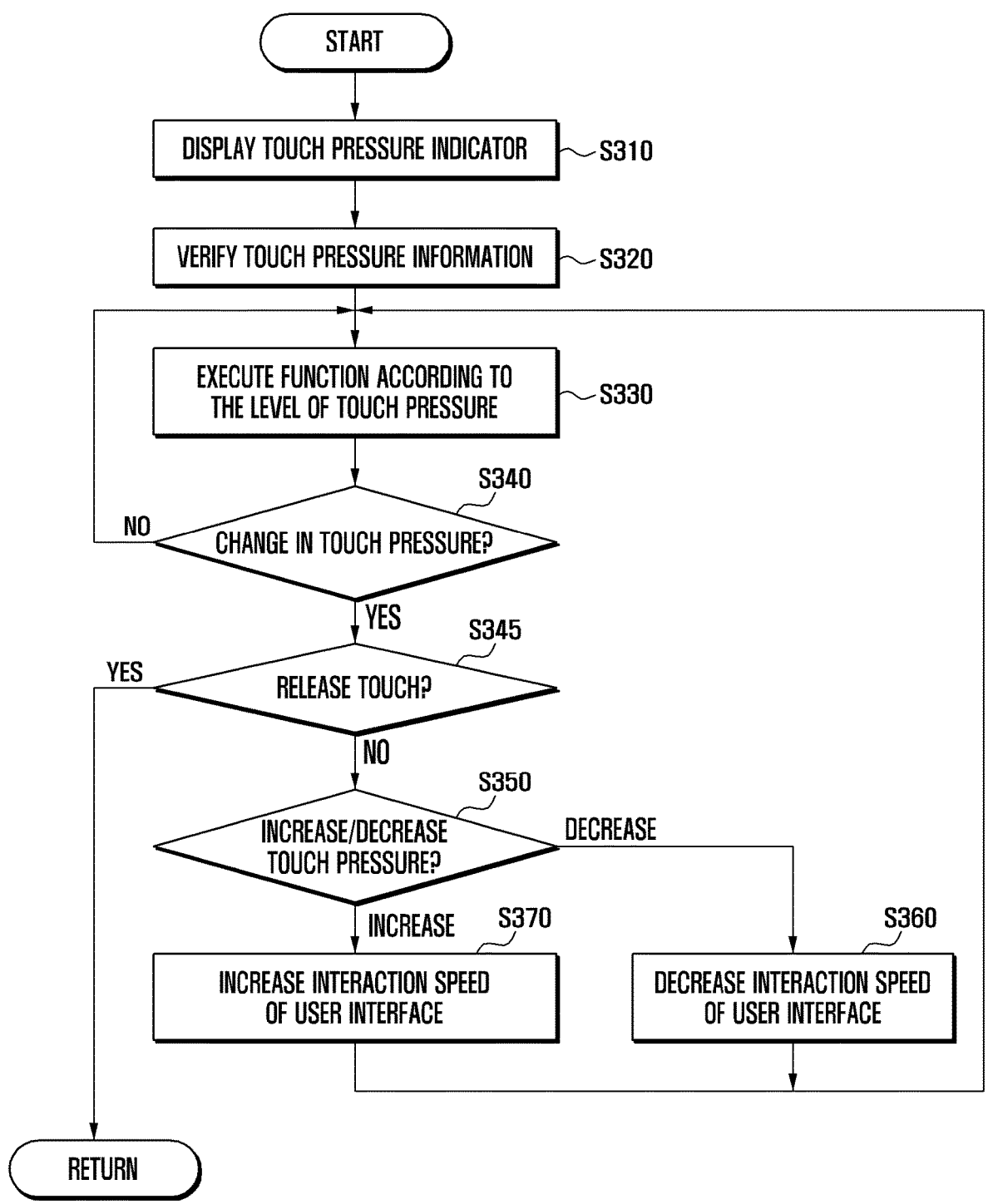
FIG. 3 is a flowchart illustrating a pressure sensitive degree control process according to an exemplary embodiment of the present invention.

FIG. 3 is a flowchart illustrating a pressure sensitive degree control process according to an exemplary embodiment of the present invention.

Once the mobile terminal enters a pressure sensitive operation mode, the user interface manager 160B controls a touch pressure indicator to display on the touchscreen unit 140 in step S310. The touch pressure indicator illustrates the degree of the pressure of a touch made on the touchscreen unit 140. The touch pressure indicator may provide an alarm notifying a user of an excessive touch pressure which may cause significant physical impact on the touchscreen.

The user interface manager 160B verifies the touch pressure information provided by the pressure extractor 160A in step S320 and executes a function, while controlling an interactive degree of the function, according to the level of the touch pressure in step S330.

In this case, the touch pressure levels and the interactive degree may be classified as shown in Table 1.

TABLE 1

| Touch pressure level (integer) | Interaction speed level |
|---|---|
| 1~10 | Level 1 |
| 11~25 | Level 2 |
| 26~40 | Level 3 |
| — | — |
| — | — |

Referring to Table 1, in a case when the pressure level of the touch made on the touch screen is 20, the user interface manager 160B sets an interaction speed level to level 2. Here, if the interaction is a screen scroll, the user interface manager 160B controls the screen to scroll at the speed of level 2. If the interaction is a sound volume adjustment, the user interface manager 160B control the volume to increase or decrease at the speed of level 2.

The user interface manager 160B monitors a detected change in the touch pressure level in step S340. If there is no change in the touch pressure level, the user interface manager 160B maintains an execution of the function.

Otherwise, if there is a change in the touch pressure level, the user interface manager 160B determines whether the touch is released in step S345. If it is determined that the touch is released, the user interface manager 160B ends the execution of the corresponding function. Otherwise, if it is determined that the touch is not released, the user interface manager 160B determines whether the pressure level of the touch is increased or decreased in step S350.

If it is determined that the pressure level of the touch is increased, the user interface manager 160B increases the interaction speed level of the user interface in step S370. In the case of the screen scroll, the user interface manager 160B increases the screen scroll speed to level 3. In the case of the sound volume adjustment, the user interface manager 160B increases or decreases the sound volume to level 3.

According to an exemplary embodiment of the present invention, if a touch pressure level is greater than a threshold, the user interface manager 160B determines that the touch pressure is increased. For example, in order to determine the increase of the touch pressure at the current interaction speed level 2, the user interface manager 160B detects the touch pressure greater than 26 which is a minimum value of a pressure range corresponding to the interaction speed level 3.

In step S350, if it is determined that the pressure level of the touch is decreased, the user interface manager 160B decreases the interaction speed level of the user interface in step S360. In the case of the screen scroll, the user interface manager 160B decreases the screen scroll speed to level 1.

If a touch pressure level is in the pressure range lower than the current pressure range detected, the user interface manager 160B determines that the touch pressure is decreased. For example, in order to determine the decrease of the touch pressure at the current interaction speed level of 2, the user interface manager 160B detects the touch pressure less than 10 which is a maximum value of the pressure range corresponding to the interaction speed level 1.

Figure 4:
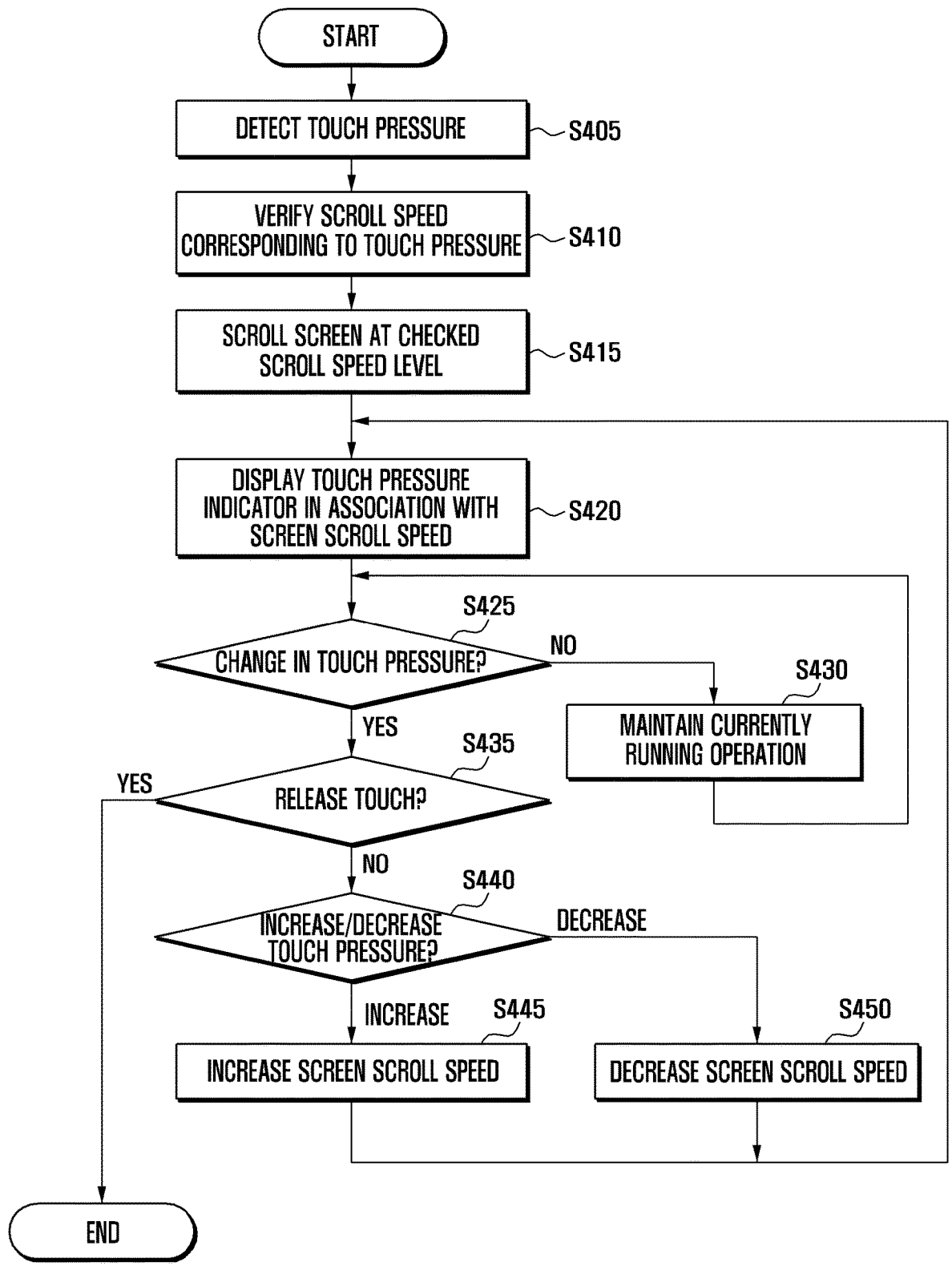
FIG. 4 is a flowchart illustrating a screen scroll adjustment process in a pressure sensitive degree control method according to an exemplary embodiment of the present invention.
Figure 6:
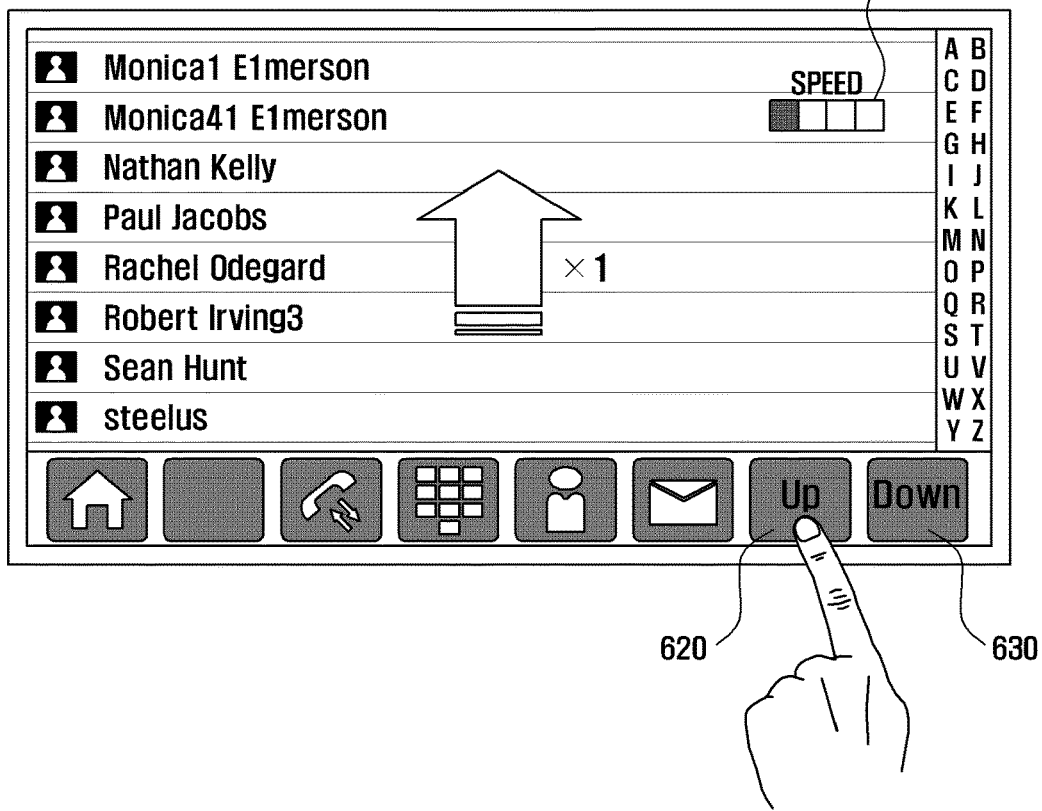
FIG. 6 is a diagram illustrating interactions of an interface in a phonebook execution screen in association with a screen scroll adjustment process according to an exemplary embodiment of the present invention.
Figure 6:
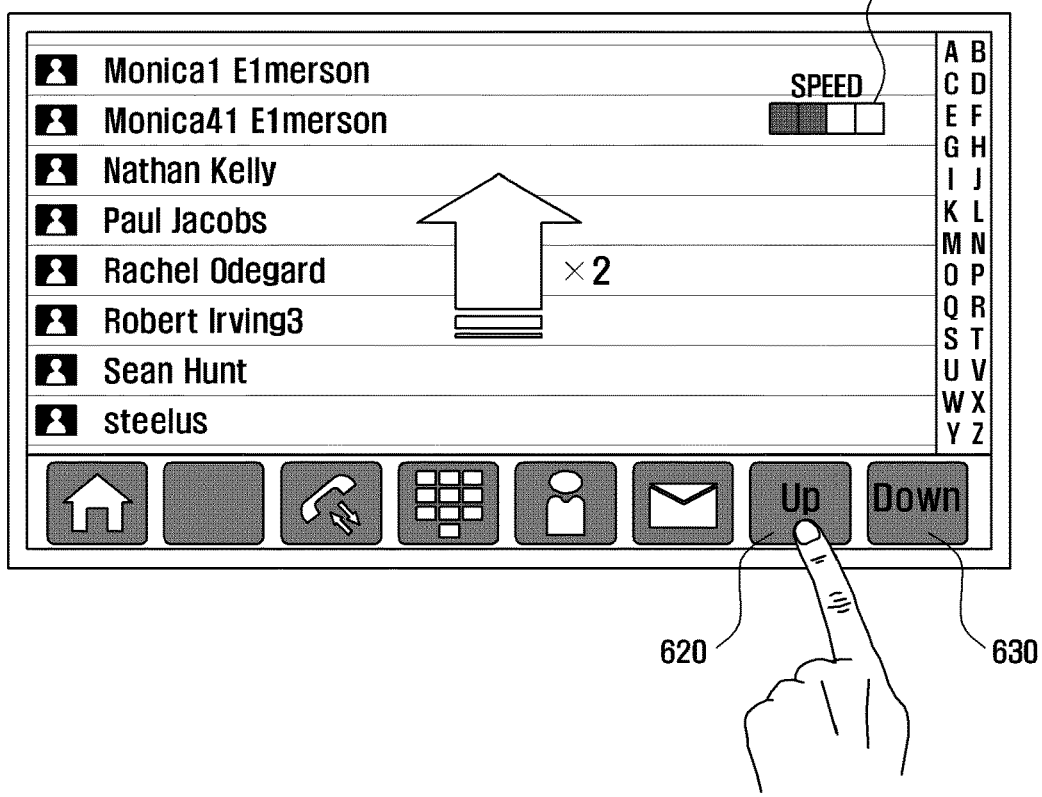

FIG. 4 is a flowchart illustrating a screen scroll adjustment process in a pressure sensitive degree control method according to an exemplary embodiment of the present invention. FIG. 6 is a diagram illustrating interactions of an interface in a phonebook execution screen in association with a screen scroll adjustment process according to an exemplary embodiment of the present invention. The screen scroll adjustment process is described below with reference to FIGS. 4 and 6.

The screen scroll adjustment process description is directed to a case where separate soft keys are provided on the screen for controlling the interaction degree of the interface.

The user interface manager 160B verifies that the mobile terminal enters a pressure sensitive operation mode. The pressure sensitive operation mode may be activated with an execution of applications such as a phonebook application, an audio playback application, and a picture display application including a list of items that may not be displayed on the screen simultaneously. FIG. 6 illustrates the execution screen of the phonebook application. Once the mobile terminal enters the pressure sensitive operation mode, the user interface manager 160B configures such that the interaction speed of the interface is changed according to pressure level of a touch made on a soft key.

Referring to FIG. 6, a pair of scroll keys 620 and 630 are formed at the bottom of the touchscreen. If a touch is made on the up scroll key 620, the touchscreen transmits a touch signal to the control unit 160. If the touch signal is received, the pressure extractor 160A of the control unit 160 extracts the touch pressure information from the touch signal and transfers the touch pressure information to the user interface manager 160B. The user interface manager 160B verifies the touch pressure value in the touch pressure information provided by the pressure extractor 160A in step S405.

The user interface manager 160B verifies a scroll speed level corresponding to the touch pressure value in step S410. In a case when the touch pressure value is 5, the corresponding scroll speed level is 1. The user interface manager 160B scrolls the screen upward at the scroll speed level 1 in step S415. The execution screen part <a> of FIG. 6 illustrates the screen scrolling at speed level 1.

The user interface manager 160B displays a touch pressure indicator 610 indicating the current scroll speed (i.e., level 1) as illustrated in FIG. 6 in step S420. The user may verify the pressure level of the touch made on the touchscreen visually with the touch pressure indicator 610. The touch pressure indicator 610 may be configured to provide an alarm to notify of excessive touch pressure which can cause significant physical impact on the touchscreen.

The user interface manager 160B monitors the touch to detect change in pressure level in step S425. If no change is detected in the pressure level, the user interface manager 160B maintains the currently running operation in step S430, i.e., scrolling the phonebook screen upward at the speed of level 1.

If a change is detected in the pressure level, the user interface manager 160B determines whether the touch is released in step S435. If it is determined that the touch is released, the user interface manager 160B ends the execution of the corresponding function. If it is determined that the touch is not released, the user interface manager 160B determines whether the touch pressure is increased or decreased in step S440.

If it is determined that the touch pressure is increased, the user interface manager 160B controls such that the screen scroll speed increases in step S445.

In order to determine the increase of the touch pressure at the current scroll speed of level 1, the user interface manager 160B detects the touch pressure in the range of 11~25 (see Table 1). As illustrated in the execution screen part <b> of FIG. 6, the scrolling speed of the phonebook screen increases to level 2.

The user interface manager 160B then updates the touch pressure indicator 610 to indicate the scroll speed (i.e., level 2) in step S420.

If the touch pressure is decreased, the user interface manager 160B controls the screen scroll speed to decrease in step S450.

The user interface manager 160B repeats the above-described operations until the touch is released in step S440. If the touch is released, the corresponding function, i.e., phonebook screen scroll, ends.

Although the phonebook application screen has been described with the soft keys 620 and 630 for inputting the pressure-driven scrolling command in an exemplary embodiment of the present invention, the present invention is not limited thereto. For example, the soft keys may be combined into a single key to increase the scroll speed for level 1 and level 2 and decrease the scroll speed for level 3 and level 4.

The phone book application screen description is directed to the scroll speed control of the phonebook screen with reference to FIG. 6. However, the present invention is not limited thereto. Accordingly, the scroll speed control may be applied to various types of user interfaces displaying and setting information.

Figure 7:
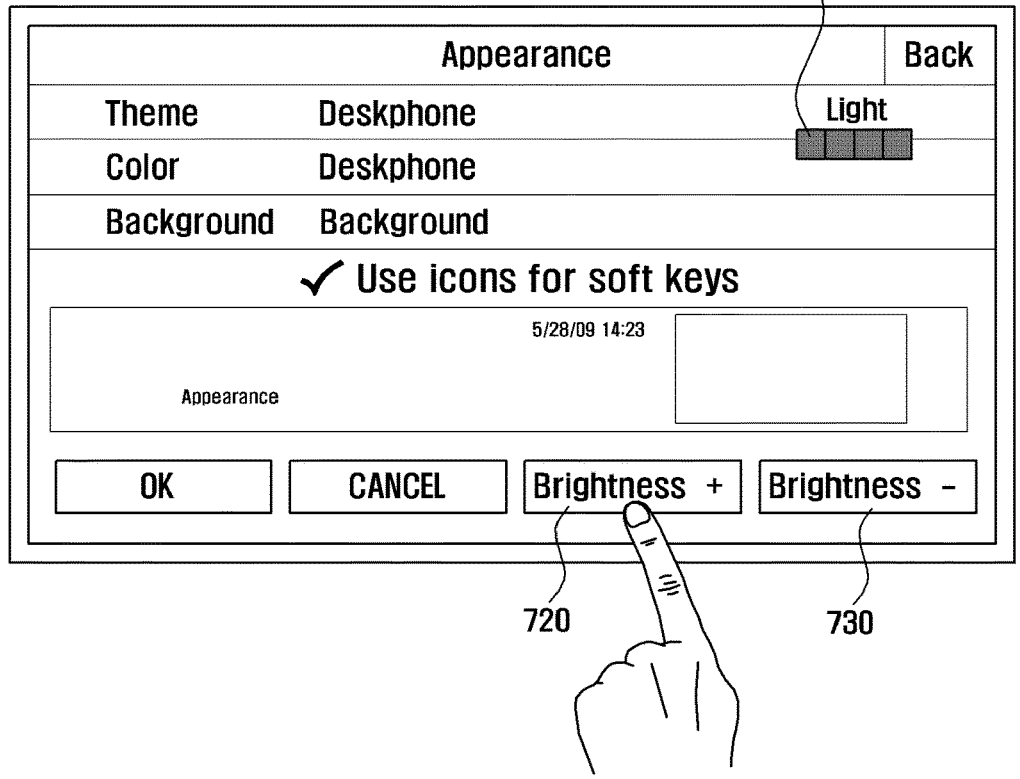
FIG. 7 is a diagram illustrating interactions of an interface in a backlight brightness adjustment screen in a pressure sensitive degree control method according to an exemplary embodiment of the present invention.
Figure 7:
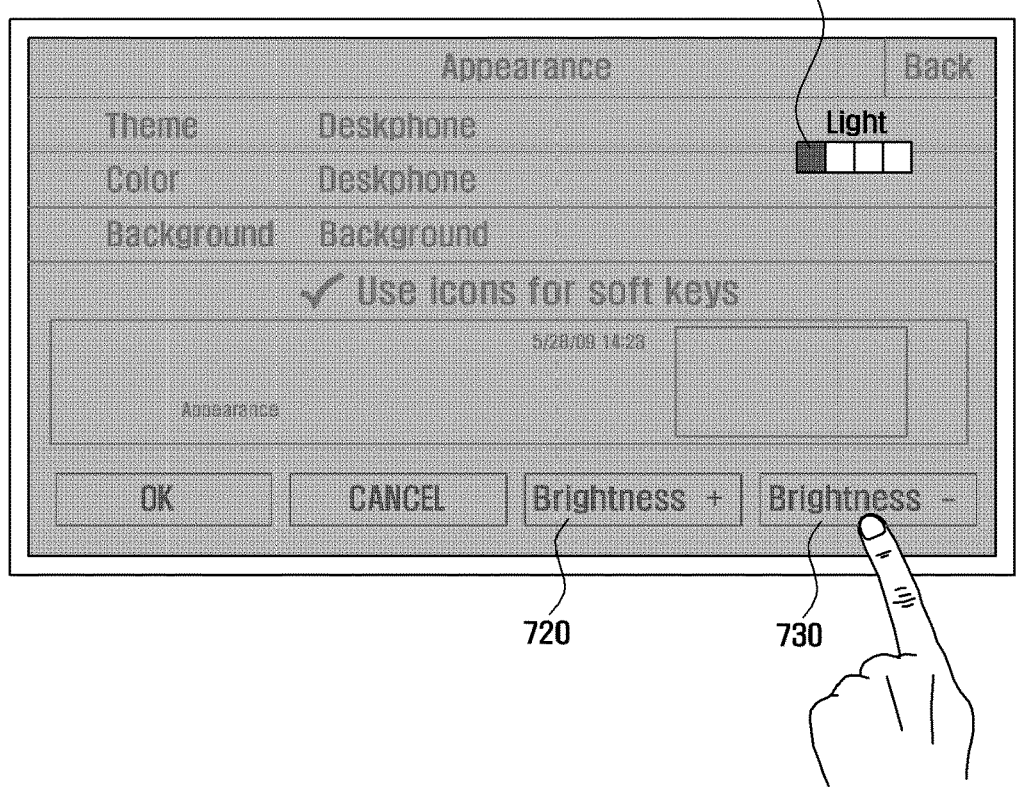

FIG. 7 is a diagram illustrating interactions of an interface in a backlight brightness adjustment screen in a pressure sensitive degree control method according to an exemplary embodiment of the present invention.

Referring to FIG. 7, the backlight brightness adjustment part <a> illustrates a touch that is made on a brightness+soft key 720 at pressure corresponding to an interaction speed of level 4. In this case, the backlight becomes bright at the interaction speed of level 4, and the touch pressure indicator 710 indicates the interaction speed of level 4 corresponding to the current pressure value. As the touch pressure decreases, the backlight becomes bright at a slow speed.

The backlight brightness adjustment screen part <b> illustrates a touch that is made on a brightness—soft key 730 at pressure corresponding to the interaction speed of level 1. In this case, the backlight becomes dark at the interaction speed of level 1, and the touch pressure indicator 710 indicates the interaction speed of level 4 corresponding to the current pressure value. As the touch pressure increases, the backlight becomes dark at a fast speed.

Figure 5:
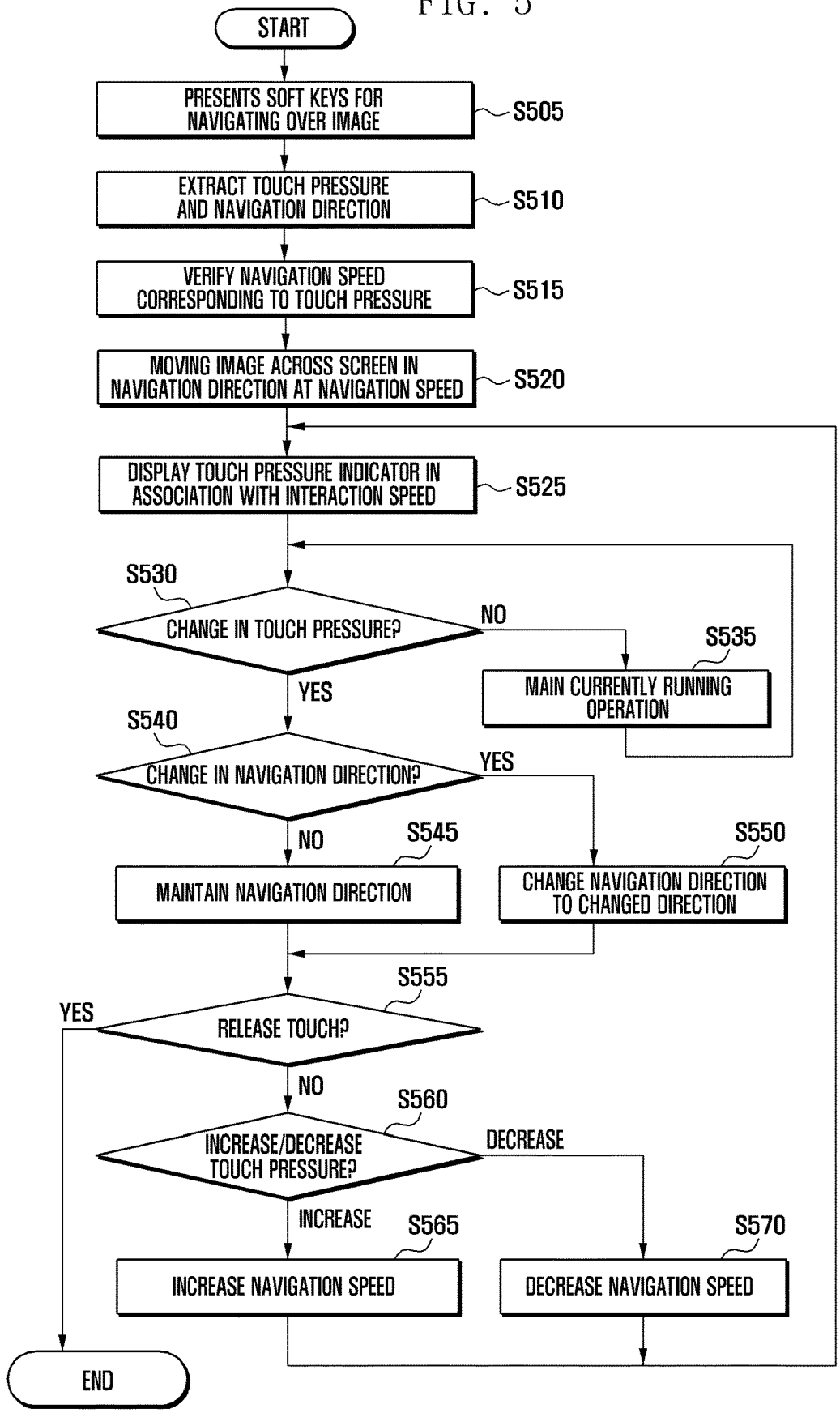
FIG. 5 is a flowchart illustrating an intra-image navigation process in a pressure sensitive degree control method according to an exemplary embodiment of the present invention.

FIG. 5 is a flowchart illustrating an intra-image navigation process in the pressure sensitive degree control method according to an exemplary embodiment of the present invention. FIGS. 8A to 8E are diagrams illustrating interactions of the interface in an exemplary image viewer execution screen in association with the intra-image navigation process of FIG. 5. The intra-image navigation process is described below with reference to FIGS. 5 and 8A to 8E.

The description of the intra-image navigation process is directed to a case where no separate soft keys for controlling the interaction degree of the interface is provided.

Figure 8A:
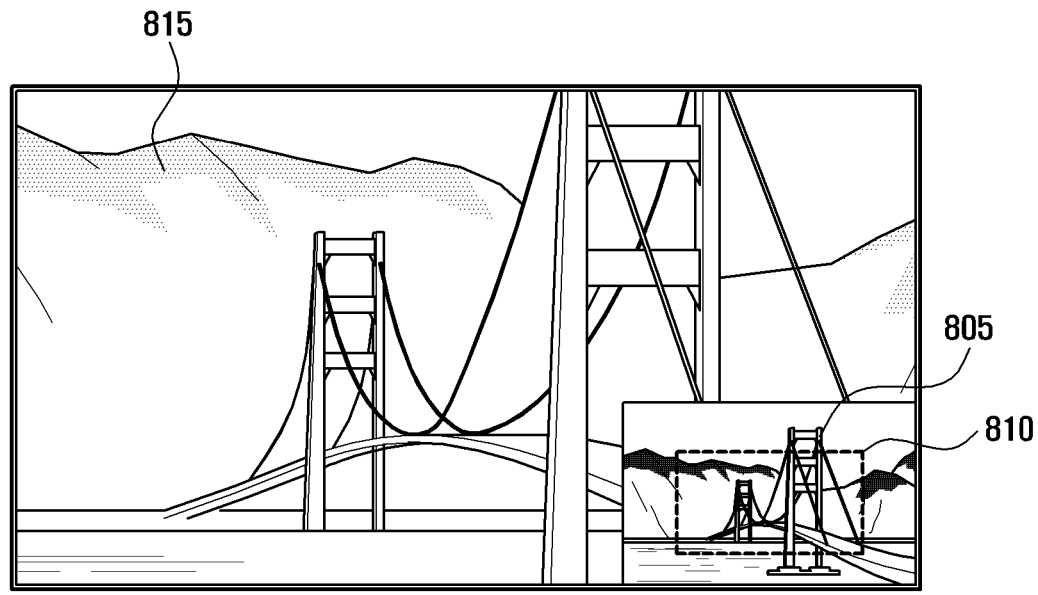
FIGS. 8A to 8E are diagrams illustrating interactions of an interface in an image viewer execution screen in association with an intra-image navigation process according to an exemplary embodiment of the present invention.

The user interface manager 160B verifies that the mobile terminal enters the pressure sensitive operation mode. The pressure sensitive operation mode may be activated with an execution of an image viewer application as illustrated in FIG. 8A. The intra-image navigation process description is directed to a case in which it is difficult to display the entire image 805 on the screen and a portion 815 of the image placed in a frame 810 is displayed on the screen.

Figure 8B:
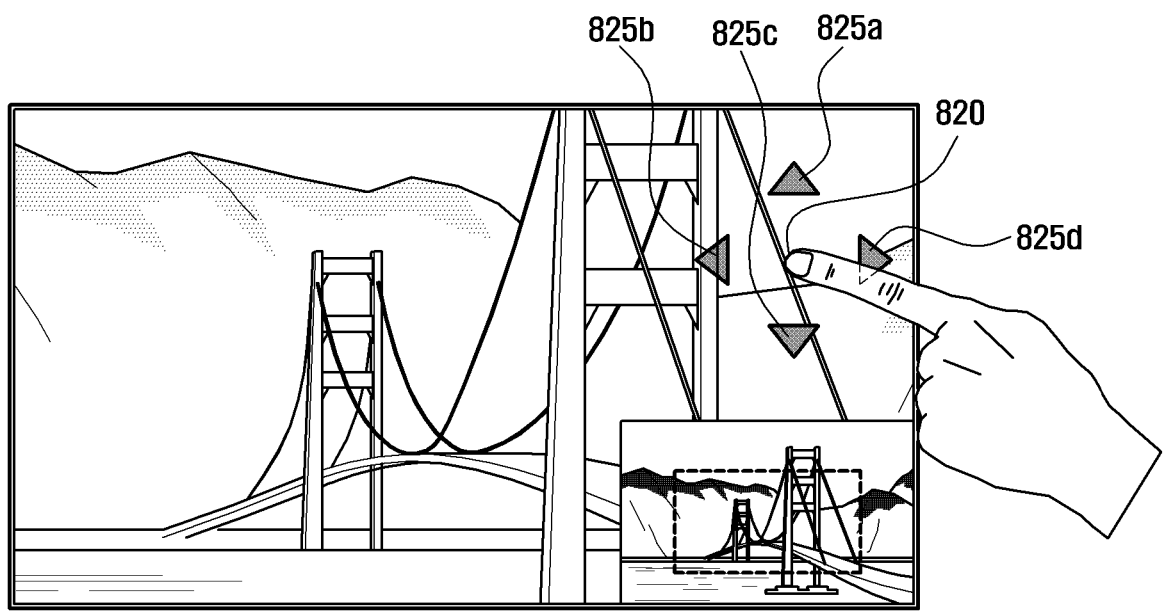

The user interface manager 160B monitors the touchscreen to detect a touch thereon. If a touch is detected on the touch screen, the user interface manager 160B presents soft keys for navigating over the image as illustrated in FIG. 8B in step S505. The soft keys are navigations keys including an upward navigation key 825a, a downward navigation key 825c, a leftward navigation key 825b, and a rightward navigation key 825d. Although the navigation soft keys appear on the screen in FIG. 8B, it is not necessary to present the navigation keys. For example, the navigation direction may be determined according to a position of a second touch input from a reference point 820 where a first touch is made.

The user interface manager 160B detects a touch on one of the navigation soft keys and extracts touch pressure and navigation direction information from the touch signal received from the touchscreen 140 in step S510. The user interface manager 160B may extract the navigation direction according to the touched navigation key or touching direction. The user interface manager 160B verifies the navigation speed corresponding to the touch pressure in step S515.

Figure 8C:
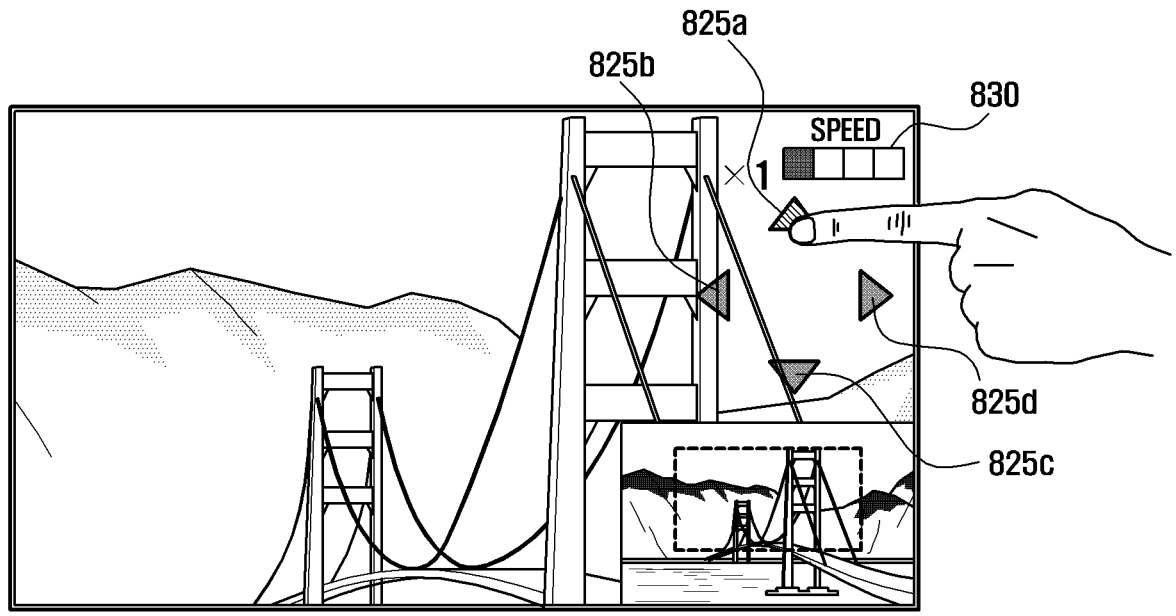

Also, the user interface manager 160B controls the intra-image navigation by moving the image across the screen in the navigation direction at the navigation speed in step S520. If the upward navigation key 825a is touched at the pressure corresponding to the interaction speed level 1 as illustrated in FIG. 8C, the user interface manager 160B controls the image to move upward across the screen.

According to an exemplary embodiment of the present invention, the user interface manager 160B may display a touch pressure indicator 830 indicating the pressure level in association with the corresponding interaction speed (i.e., level 1) at a corner of the screen in step S525.

The user interface manager 160B monitors the touch to detect change in the pressure level in step S530. If no change in the pressure level is detected, the user interface manager 160B maintains the currently running operation in step S535.

If a change in the pressure level is detected, the user interface manager 160B determines whether a change is detected in navigation direction in step S540. If no change in the navigation direction is detected, the user interface manager 160B maintains the intra-image navigation without changing the navigation direction in step S545. Otherwise, if change is detected in the navigation direction, the user interface manager 160B changes the navigation direction in step S550.

The user interface manager 160B determines whether the touch is released in step S555. If it is determined that the touch is released, the user interface manager 160B ends the execution of the corresponding function. Otherwise, if it is determined that the touch is not released, the user interface manager 160B determines whether the touch pressure is increased or decreased in step S560.

If it is determined that the touch pressure is increased, the user interface manager 160B controls such that the intra-image navigation speed increases in step S565. Otherwise, if it is determined that the touch pressure is decreased, the user interface manager 160B controls such that the intra-image navigation speed decreases in step S570.

In a case when the user increases the pressure level of the touch made on the upward navigation key 825a for interaction speed of level 2, the user interface manager 160B controls the intra-image navigation speed to increase up to level 2.

Figure 8D:
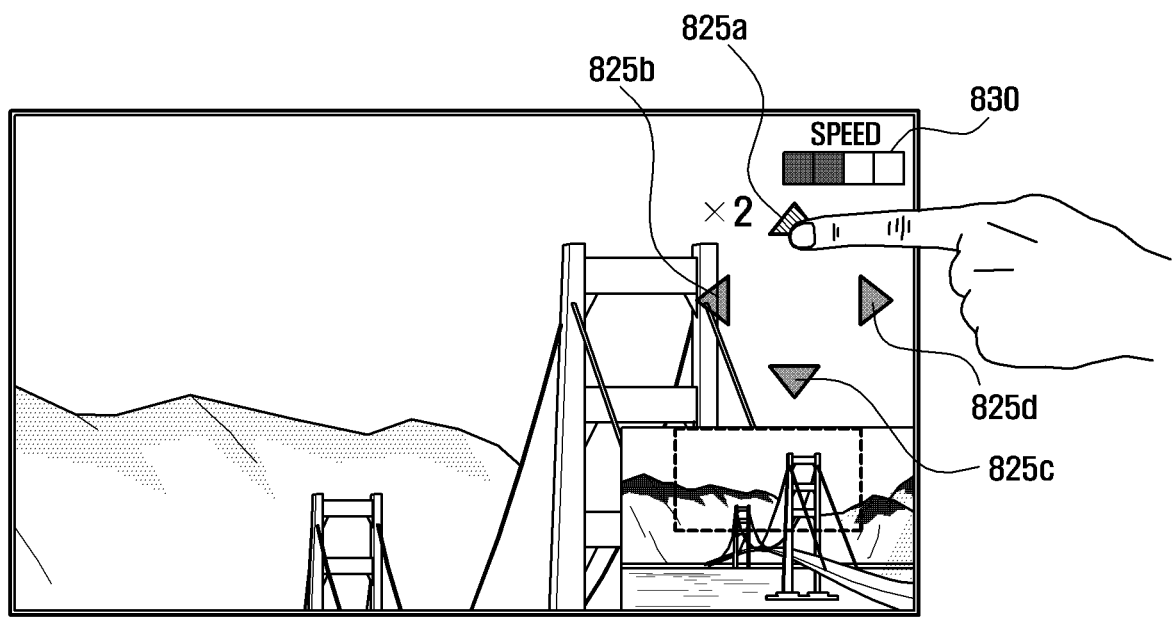

The user interface manager 160B updates the touch pressure indicator 830 in step S525 to indicate the navigation speed of level 2 as illustrated in FIG. 8D.

Figure 8E:
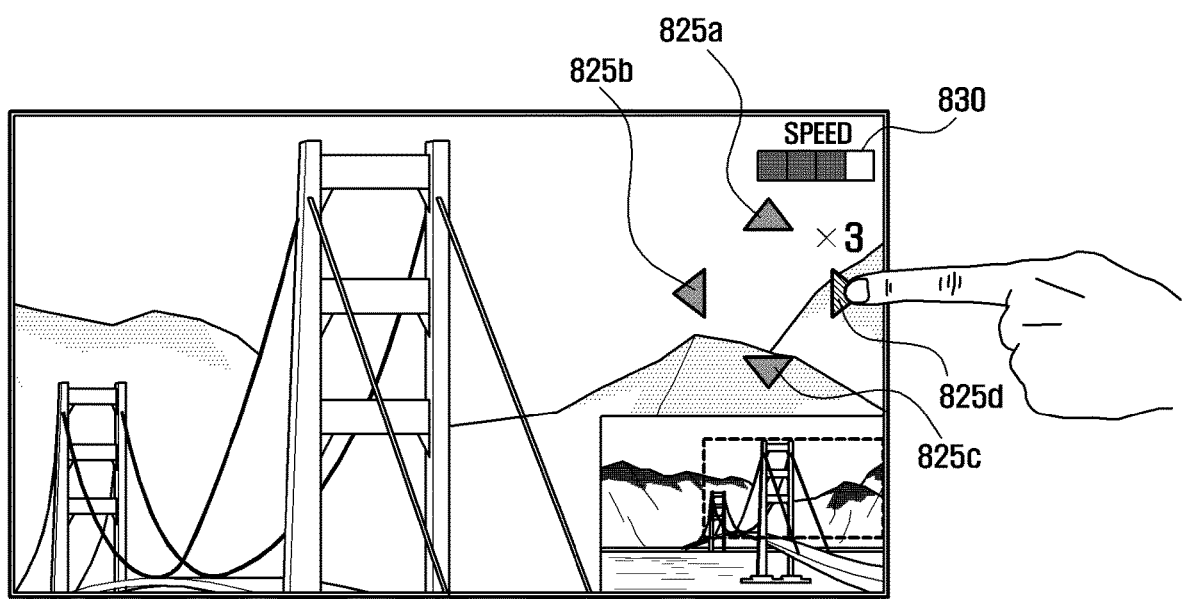

FIG. 8E illustrates a diagram in which the touch pressure and navigation direction are changed while performing the intra-image navigation. If a touch is made on the rightward navigation key 825d at a pressure corresponding to the interaction speed of level 3, the user interface manager 160B increases the navigation speed in a rightward direction to level 3.

As described above, the pressure-sensitive degree control method and system according to exemplary embodiments of the present invention adjusts the interaction speed of the user interface according to the pressure level of a touch made on the touchscreen, thereby improving utilization efficiency of the user interface. The pressure-sensitive degree control method and system of the present invention informs the user of the pressure level of the touch made on the touchscreen by means of a touch pressure indicator and by alarming the user of the significant physical impact on the touchscreen.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for a mobile terminal, the method comprising:
executing an image viewer application to display a screen including a plurality of display objects, the plurality of display objects including a first frame including a magnified version of a portion of an image, and a second smaller frame including an entirety of the image, the second smaller frame contained in the first frame;
determining, by a user interface manager of the mobile terminal, to operate in a pressure sensitive mode based on the execution of the image viewer application;
detecting a touch input made on the screen without an input of any other menu item;
based on the detection of the touch input, displaying a plurality of navigation keys for image navigation within the first frame, the plurality of navigation keys displayed around a touch point of the touch input;
while the touch input is being detected, displaying a different portion of the image in the first frame based on a navigation input on at least one of the plurality of navigation keys; and
in response to the navigation input, updating an indicator in the second smaller frame, the indicator indicating which portion of the entire image is displayed in the first frame.

2. The method of claim 1, further comprising:
displaying an indicator in the first frame indicating a speed of navigation in the first frame.

3. The method of claim 2, wherein when a pressure level of the navigation input increases, the speed of the navigation increases.

4. The method of claim 2, wherein when a pressure level of the navigation input decreases, the speed of the navigation decreases.

5. The method of claim 1, further comprising:
displaying information associated with the touch input, wherein the information associated with the touch input includes a description of an operation corresponding to the touch input.

6. The method of claim 1, further comprising outputting information for notifying of excessive touch pressure.

7. The method of claim 1, further comprising controlling at least one of a scroll interface, a volume adjustment interface, a brightness adjustment interface, an intra-image navigation speed adjustment interface, a length adjustment interface, or an image zoom adjustment interface.

8. The method of claim 1, further comprising:
wherein a degree of change in a speed of navigation within the first frame is controlled to a first speed level when a first touch input corresponding to a first pressure level is detected, and
wherein the degree of the change in the speed of navigation within the first frame is controlled to a second speed level when a second touch input corresponding to a second pressure level is detected.

9. An apparatus of a mobile terminal, the apparatus comprising:
a touchscreen; and
at least one processor configured to:
execute an image viewer application to display a screen on the touchscreen, the screen including a plurality of display objects, the plurality of display objects including a first frame including a magnified version of a portion of an image, and a second smaller frame including an entirety of the image, the second smaller frame contained in the first frame,
determine to operate in a pressure sensitive mode based on the execution of the image viewer application,
detect a touch input on the screen,
based on the detection of the touch input, display a plurality of navigation keys for image navigation within the first frame, the plurality of navigation keys displayed around a touch point of the touch input,
while the touch input is being detected, display a different portion of the image in the first frame based on a navigation input on at least one of the plurality of navigation keys, and
in response to the navigation input, update an indicator in the second smaller frame, the indicator indicating which portion of the entire image is displayed in the first frame.

10. The apparatus of claim 9, wherein the at least one processor is further configured to:
display an indicator in the first frame indicating a speed of navigation in the first frame.

11. The apparatus of claim 10, wherein the at least one processor is further configured to increase, when a pressure level increases, the speed of the navigation.

12. The apparatus of claim 10, wherein the at least one processor is further configured to decrease, when a pressure level decreases, the speed of the navigation.

13. The apparatus of claim 9,
wherein the at least one processor is further configured to display information associated with the touch input, and
wherein the information associated with the touch input includes a description of an operation corresponding to the touch input.

14. The apparatus of claim 9, wherein the at least one processor is further configured to output information for notifying of excessive touch pressure.

15. The apparatus of claim 9,
wherein a degree of change in a speed of navigation within the first frame is controlled to a first speed level when a first touch input corresponding to a first pressure level is detected, and
wherein the degree of the change in the speed of navigation within the first frame is controlled to a second speed level when a second touch input corresponding to a second pressure level is detected.

16. An apparatus of a mobile terminal, the apparatus comprising:
a touchscreen configured to display a screen; and
at least one processor configured to:
execute an image viewer application to display a screen on the touchscreen, the screen including a plurality of display objects, the plurality of display objects including a first frame including a magnified version of a portion of an image, and a second smaller frame including an entirety of the image, the second smaller frame contained in the first frame,
determine to operate in a pressure sensitive mode based on the execution of the image viewer application,
detect a touch input on the screen,
based on the detection of the touch input, display a plurality of navigation keys for image navigation within the first frame, the plurality of navigation keys displayed around a touch point of the touch input, while the touch input is being detected, display a different portion of
the image in the first frame based on a navigation input on at least one of the plurality of navigation keys, and
in response to the navigation input, update an indicator in the second smaller frame, the indicator indicating which portion of the entire image is displayed in the first frame.

17. The apparatus of claim 16,
wherein a degree of change in a speed of navigation within the first frame is controlled to a first speed level when a first touch input corresponding to a first pressure level is detected, and
wherein the degree of the change in the speed of navigation within the first frame is controlled to a second speed level when a second touch input corresponding to a second pressure level is detected.

18. An apparatus of a mobile terminal, the apparatus comprising:
a touchscreen; and
at least one processor configured to:
execute an image viewer application to display a screen on the touchscreen, the screen including a plurality of display objects, the plurality of display objects including a first frame including a magnified version of a portion of an image, and a second smaller frame including an entirety of the image, the second smaller frame contained in the first frame,
determine to operate in a pressure sensitive mode based on the execution of the image viewer application,
detect a touch input on a first display object on the screen without an input of any other menu item,
based on the detection of the touch input, display a plurality of navigation keys for image navigation within the first frame, the plurality of navigation keys displayed around a touch point of the touch input,
while the touch input is being detected, display a different portion of
the image in the first frame based on a navigation input on at least one of the plurality of navigation keys, and
in response to the navigation input, update an indicator in the second smaller frame, the indicator indicating which portion of the entire image is displayed in the first frame.

19. The apparatus of claim 18,
wherein a degree of change in a speed of navigation of at least the portion of the first display object is controlled to a first speed level when a first touch input corresponding to a first pressure level is detected, and
wherein the degree of the change in the speed of navigation of at least the portion of the first display object is controlled to a second speed level when a second touch input corresponding to a second pressure level is detected.

* * * * *